(12) United States Patent
Hebborn

(10) Patent No.: US 7,777,424 B2
(45) Date of Patent: Aug. 17, 2010

(54) METHOD AND APPARATUS FOR CONTROLLING AN INPUT VOLTAGE TO A LIGHT EMITTING DIODE

(75) Inventor: Kevin Hebborn, Toms River, NJ (US)

(73) Assignee: Dialight Corporation, Farmingdale, NJ (US)

( * ) Notice: Subject to any disclaimer, the term of this patent is extended or adjusted under 35 U.S.C. 154(b) by 358 days.

(21) Appl. No.: 11/839,343

(22) Filed: Aug. 15, 2007

(65) Prior Publication Data

US 2008/0042597 A1    Feb. 21, 2008

Related U.S. Application Data

(60) Provisional application No. 60/838,938, filed on Aug. 18, 2006.

(51) Int. Cl.
*H05B 41/16* (2006.01)
(52) U.S. Cl. ............... 315/247; 315/291; 315/185 S; 315/312; 315/224
(58) Field of Classification Search ............... 315/247, 315/246, 224, 291, 307–326, 185 S, 200 A
See application file for complete search history.

(56) References Cited

U.S. PATENT DOCUMENTS

| | | | |
|---|---|---|---|
| 7,323,828 B2 * | 1/2008 | Russell et al. ............... | 315/291 |
| 2003/0235062 A1 | 12/2003 | Burgyan et al. | |
| 2004/0155844 A1 | 8/2004 | Stopa | |
| 2004/0208011 A1 * | 10/2004 | Horiuchi et al. ............. | 362/458 |
| 2004/0251854 A1 * | 12/2004 | Matsuda et al. ............. | 315/291 |
| 2005/0057554 A1 | 3/2005 | Yamamoto et al. | |
| 2005/0104542 A1 | 5/2005 | Ito et al. | |
| 2005/0231127 A1 | 10/2005 | Yamamoto et al. | |
| 2006/0108933 A1 | 5/2006 | Chen | |
| 2006/0119291 A1 * | 6/2006 | Hung et al. ............. | 315/291 |

FOREIGN PATENT DOCUMENTS

EP         1860922 A1        11/2007
WO    WO-2007/023454 A1     3/2007

OTHER PUBLICATIONS

International Search Report for PCT/US07/076122 dated Mar. 24, 2008, consists of 9 pages.
Extended European Search Report for EP 07841024.8, Mar. 18, 2010, consists of 5 pages.

* cited by examiner

*Primary Examiner*—Tuyet Vo

(57) ABSTRACT

A method and apparatus for controlling an input voltage to a light emitting diode (LED) is disclosed. In one embodiment a system for controlling an input voltage to at least one LED includes an energy storage device. The energy storage device is coupled to the at least one LED. A current regulator is coupled the at least one LED for controlling activation and deactivation of the at least one LED. A control circuit is coupled to the current regulator for controlling a power supply providing an input voltage to the energy storage device, wherein the input voltage is provided in accordance with an amount of a headroom voltage measured across the current regulator.

18 Claims, 4 Drawing Sheets

METHOD AND APPARATUS FOR CONTROLLING AN INPUT VOLTAGE TO A LIGHT EMITTING DIODE

CROSS REFERENCE TO RELATED APPLICATIONS

This application claims the benefit of U.S. Provisional Patent Application No. 60/838,938 filed on Aug. 18, 2006, which is herein incorporated by reference.

FIELD OF THE INVENTION

The present invention relates generally to monitoring an input voltage and total forward voltage of one or more light emitting diodes (LEDs) and more specifically to controlling an input voltage to the LEDs in accordance with a headroom voltage.

BACKGROUND OF THE INVENTION

Use of current regulators to control the current pulses of a light emitting diode (LED) in a strobe application has the advantage of simplicity and minimal radiated emissions, however they can be inefficient. Maximum efficiency is achieved when the input voltage to the LED is close to the forward voltage ($V_f$) of the LED. Ideally the input voltage to the current regulator should be set to be slightly above the total $V_f$ of the LED. In practice, this poses a problem because the input voltage required to drive the LEDs (i.e. $V_f$) will vary with temperature and from LED to LED. As a result, the $V_f$ may drift over time with continued use.

Present applications apply an overdrive voltage such that the input voltage is much higher than the total $V_f$ due to the varying voltage requirements across a plurality of LEDs. This method plans for the worst case scenario to ensure that the strobe's LEDs will have enough voltage to activate in a strobe application. Therefore, the overdrive voltage provides much more input voltage than needed because currently there is no way of identifying how much input voltage is sufficient to activate the strobe's LEDs. However, applying an overdrive voltage is inefficient and leads to large amounts of wasted energy in the form of dissipated heat.

SUMMARY OF THE INVENTION

In one embodiment, the present invention provides a system for controlling an input voltage to at least one light emitting diode (LED). The system comprises an energy storage device coupled to at least one LED. The system further includes a current regulator coupled to said at least one LED for controlling activation and deactivation of said at least one LED. The current regulator is also coupled to a control circuit, the control circuit for controlling a power supply providing said input voltage to said energy storage device, wherein said input voltage is provided in accordance with an amount of headroom voltage measured across said current regulator.

In another embodiment, the present invention provides a system for controlling an input voltage to at least one LED comprising a means for storing energy. The means for storing energy is coupled to at least one LED. A means for regulating current to said at least one LED is coupled to said at least one LED. The means for regulating current is for controlling activation and deactivation of said at least one LED. The means for regulating current to said at least one LED is coupled to a means for controlling input voltage to said at least one LED, the means for controlling input voltage to said at least one LED for controlling a means for providing said input voltage to said means for storing energy, wherein said input voltage is provided in accordance with an amount of headroom voltage measured across said means for regulating current.

In another embodiment, the present invention provides a method for controlling an input voltage to at least one LED comprising providing said input voltage to said at least one LED from an energy storage device. Then the method activates a current regulator to release said input voltage stored in said energy storage device to activate said at least one strobe LED. Subsequently, an amount of headroom voltage across said current regulator is measured. The method concludes by adjusting said provided input voltage to said at least one LED in accordance with said amount of headroom voltage across said current regulator via a control circuit controlling a power supply.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
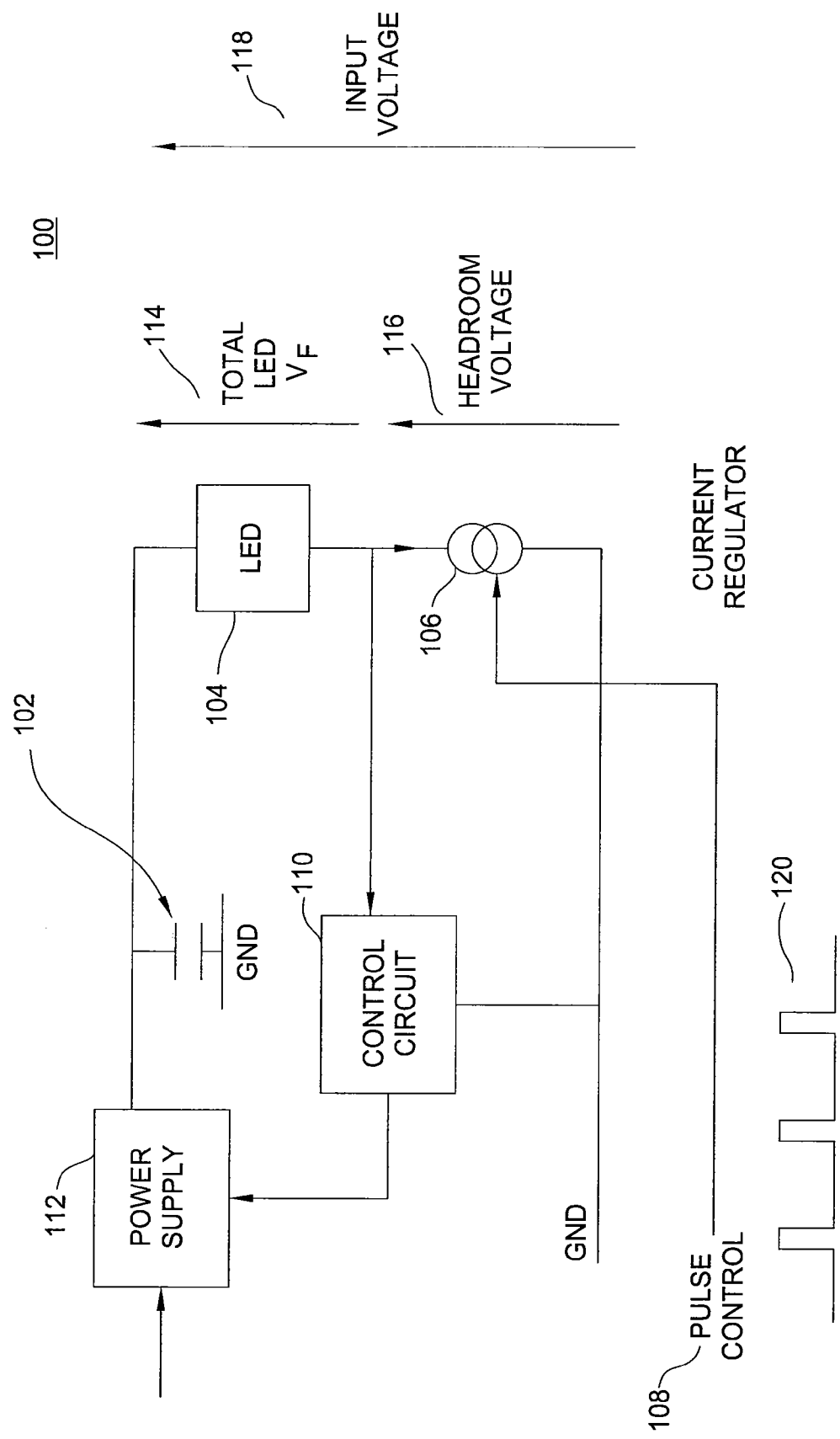
FIG. 1 illustrates a high level block diagram of an illustrative embodiment of the present invention.

FIG. 1 illustrates a high level block diagram of an illustrative embodiment of a system 100 for monitoring input voltage and total forward voltage of one or more light emitting diodes (LEDs) of the present invention. In one embodiment, the system comprises an energy storage device 102, at least one LED 104, a current regulator 106, a pulse control 108, a control circuit 110 and a power supply 112.

In an illustrative embodiment of system 100, the power supply 112 may be coupled to the energy storage device 102 for supplying a voltage to the energy storage device 102. In an illustrative embodiment, the energy storage device 102 may be a capacitor, inductor or battery.

The energy storage device 102 may be coupled to at least one LED 104. The at least one LED 104 may be a plurality of LEDs. Those skilled in the art will recognize that the at least one LED 104 may be in any arrangement or any type of LED depending on the lighting application. Moreover, the at least one LED 104 may be controlled to provide a strobe application, e.g. flashing on and off, in a beacon or a strobe assembly. The voltage stored in energy storage device 102 may be used to power, e.g., to provide an input voltage, to the at least one LED 104.

The at least one LED 104 may be coupled to a current regulator 106, which in turn may be coupled to a pulse control 108. The pulse control 108 transmits a series of control pulses 120 to the current regulator 106, thereby activating the energy storage device 102 to release energy stored in the energy storage device 102 across the at least one LED 104. In an illustrative embodiment of the present invention, the current regulator may be a linear current regulator. In other words, when excess voltage not used by the at least one LED 104 is passed across the current regulator 106, the excess voltage is dissipated as heat. The current regulator 106 may regulate the amount of current that passes through the at least one LED 104.

As discussed above, current LEDs in strobe applications are powered assuming a worst case scenario. Typically, an overdrive voltage is applied to the LEDs such that an input voltage is much higher than a total forward voltage ($V_f$) (i.e. the amount of current passing through the at least one LED 104) due to the varying resistance across the LEDs or drifting of the $V_f$ over time. As a result, the overdrive voltage provides much more input voltage than needed. This method is inefficient and leads to large amounts of wasted energy in the form of dissipated heat.

An illustrative embodiment of the present invention resolves this problem by coupling a control circuit 110 to the current regulator 106 (or to one terminal of the at least one LED 104) and the power supply 112. The control circuit 110 adjusts the input voltage delivered to the energy storage device 102 by the power supply 112 by monitoring a voltage, e.g., a headroom voltage, across the current regulator 106. One skilled in the art will recognize that the control circuit 110 may be implemented via analog or digital means.

Headroom voltage is the amount of excess voltage that is passed across the current regulator when the at least one LED 104 is activated. The headroom voltage represents the amount of excess voltage at the end of one of the pulses 120 provided by pulse control 108. For example, headroom voltage may be calculated from the difference in total input voltage and the total LED $V_f$. To achieve maximum efficiency of the system 100, the ideal value for the headroom voltage would be zero by storing an amount of energy in the energy storage device 102 that equals the LED $V_f$. However, in practice minimizing the headroom voltage to a small value is more practical. A simple diagram on FIG. 1 illustrates the relationship between input voltage, total LED $V_f$ and headroom voltage. Since the input voltage is applied across the at least one LED 104 and current regulator 106, as the input voltage 118 increases, the headroom voltage 116 also increase. In other words, only the portion of the input voltage 118 that equals the total LED $V_f$ 114 is efficiently used, whereas the excess headroom voltage 116 is lost in the form of heat. Thus, reducing the input voltage 118 to slight above the total LED $V_f$ 114 will be ideal.

In one embodiment, the control circuit 110 receives an input indicating the amount of actual headroom voltage measured across the current regulator 106. The control circuit 110 then compares the headroom voltage to a predefined threshold stored in the control circuit 110 representing an acceptable amount of headroom voltage (e.g., 1-2 volts). It should be noted that the predefined threshold can be selected in accordance with the requirements of specific applications. As such, the value selected for the predefined threshold should not be interpreted to limit the present invention. If the actual headroom voltage is greater than the predefined threshold, then control circuit 110 may adjust the input voltage delivered to the energy storage device 102 by the power supply 112, e.g. reducing the input voltage to the energy storage device 102. However, if the actual headroom voltage is less than or equal to the predefined threshold, then no adjustment of the input voltage is necessary. When the actual headroom voltage is greater than the predefined threshold, the input voltage may be continually adjusted via the above comparison of the actual headroom voltage versus the predefined threshold until the actual headroom voltage is less than or equal to the predefined threshold. A more detailed discussion of the circuitry of the control circuit 110 is discussed below with reference to circuit diagrams illustrated in FIG. 2 and FIG. 3.

The predefined threshold may be any value. In an illustrative embodiment of the present invention, the predefined threshold may be set to a value that represents an acceptable amount of headroom voltage. Stated another way, the predefined threshold may be set to a value that represents an amount of voltage above the required $V_f$ of the at least one LED 104. For example, the predefined threshold may be set to a value of 1-2 volts. As a result, even if the $V_f$ of the at least one LED 104 drifts with time, the actual headroom voltage will be compared to a constant number that does not change over time.

Notably, the control circuit 110 may help the system 100 operate at a higher efficiency even over continued use and the resistance of the at least one LED 104 changes. Consequently, wasted energy is minimized and a savings in energy and costs may be realized. Furthermore, the amount of dissipated heat is also reduced, thereby increasing reliability of the light assembly.

Figure 2:
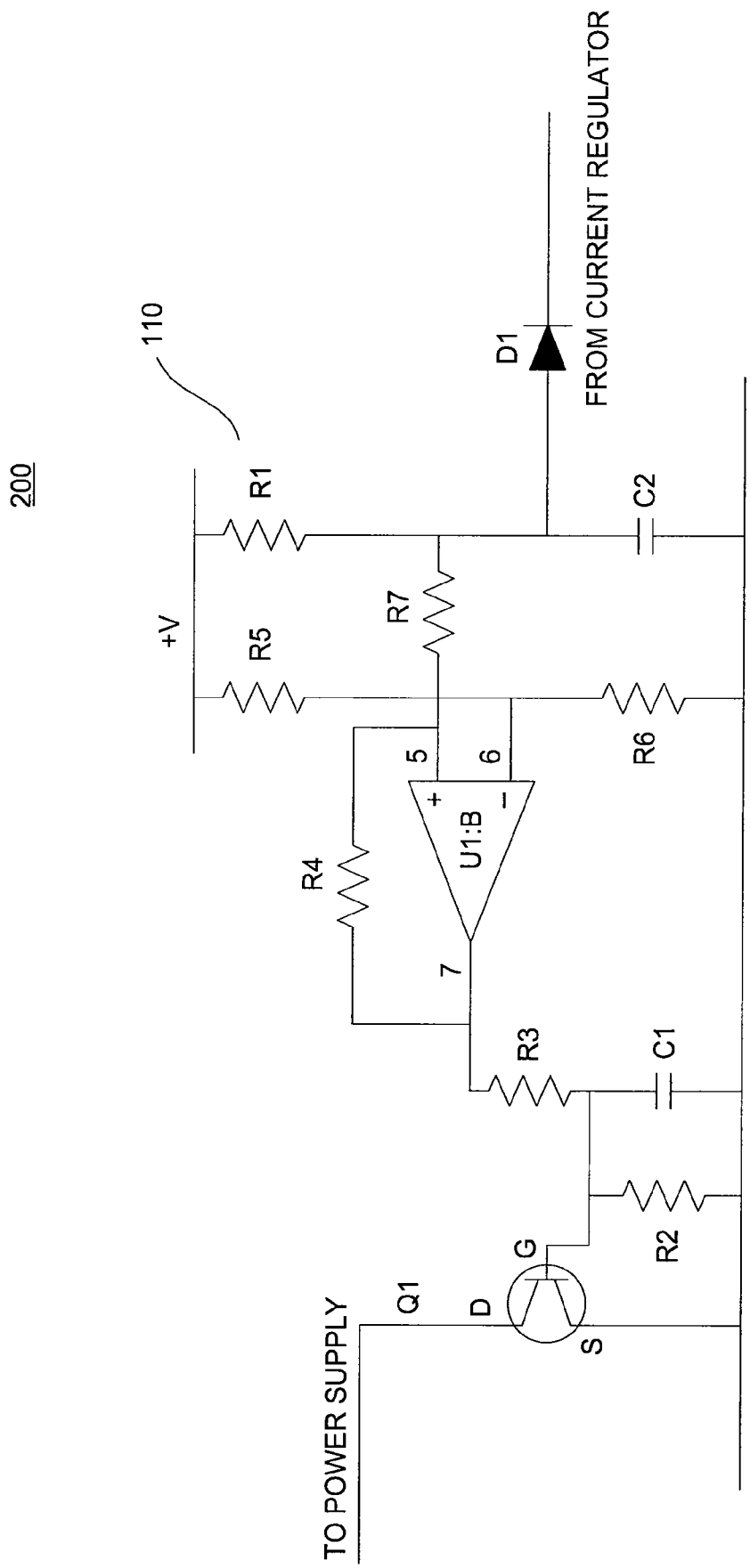
FIG. 2 illustrates an example of an analog circuit diagram of a control circuit of the present invention.

FIG. 2 illustrates an illustrative analog circuit diagram 200 of the control circuit 110. In one embodiment, a capacitor C2 charges through a resistor R1 during the at least one LED 104 off-time. Subsequently, the capacitor C2 is discharged during every strobe pulse 120 through D1, which is connected to one terminal of the current regulator 106 or one terminal of the at least one LED 104. Thus, the voltage on C2 will be a saw tooth, whose minimum level equals the voltage across the current regulator 106 and a peak level determined by the value of the resistor R1.

Dividers R5 and R6 set a reference on an inverting input of an op-amp U1. This reference is equivalent to the predefined threshold discussed above with reference to control circuit 110. This reference is compared with the saw tooth waveform on the non-inverting input. As a result, a pulse width modulated waveform (PWM) appears on the output of the op-amp whose duty cycle increases as the lowest voltage across the current regulator 106 increases.

The PWM output from the op-amp is integrated and conditioned by resistors R3 and R2 and capacitor C1 to provide a gate drive voltage for a variable resistor Q1. As the gate drive signal varies so does the drain-source impedance of the variable resistor Q1, which is used to adjust the power supply 112 charging the energy storage device 102. Thus, the variable resistor Q1 may be programmed in any way to adjust the power supply 112 depending on how the analog circuit 200 is implemented. In other words, the variable resistor Q1 may be programmed to increase or decrease the amount of voltage outputted by power supply 112 in response to either decreasing or increasing the resistance of the variable resistor Q1.

Figure 3:
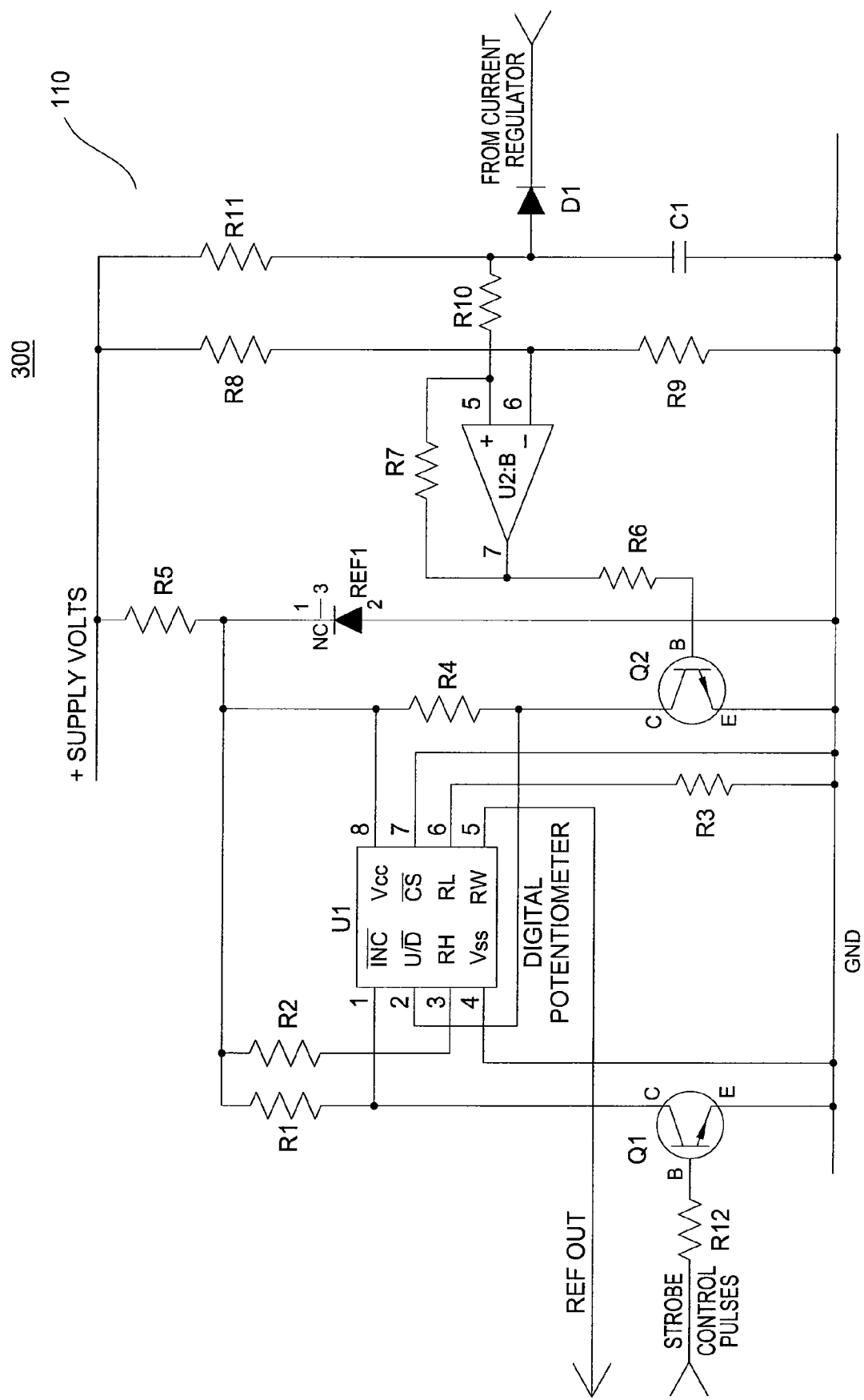
FIG. 3 illustrates an example of a digital circuit diagram of a control circuit of the present invention.

FIG. 3 illustrates an illustrative digital circuit diagram 300 of a control circuit. U1 is a digital potentiometer fed by a reference voltage generated by voltage reference diode REF1 and resistor R5. Resistors R2 and R3 connect to the top and bottom of the digital potentiometer U1 resistance ladder to set the highest and lowest extremes of its output (REF OUT) from the wiper (pin 5 of U1). This output is used to set the charging current or voltage from the power supply 112 that charges the energy storage device 102.

A first transistor Q1 drives the increment input of the digital potentiometer U1. The first transistor Q1 is driven with pulses 120 at the same duty cycle as the strobe LED flashes of the at least one LED 104. Therefore, at the end of each flash the digital potentiometer U1 will either, increment or decrement the voltage on its wiper (REF OUT) and thereby either increase or decrease the charge rate of the energy storage device 102.

D1 connects to the top of the current regulator 106 (which is also the bottom of the at least one LED 104). At the end of each pulse 120 the voltage across the current regulator 106 is stored on capacitor C2. This voltage is compared to the voltage on pin 6 of comparator U2, set by dividers R8 and R9. If the current regulator 106 voltage is higher than that set by R8 and R9, U2 output will be high, if lower then U2 output will be low.

A second transistor Q2 is used as an inverter/level shifter to match the output of U2 to the UP/DOWN signal input on pin 2 of U1. Therefore, the comparator U2 and the second transistor Q2 determine whether the wiper of U2 moves up or down at the end of each pulse 120.

Thus REF OUT is constantly adjusted up or down. So setting the charge rate of the energy storage device 102 for minimal voltage across the current regulator 106 at the end of each pulse 120 may minimize the current regulator's 106 heat dissipation.

Figure 4:
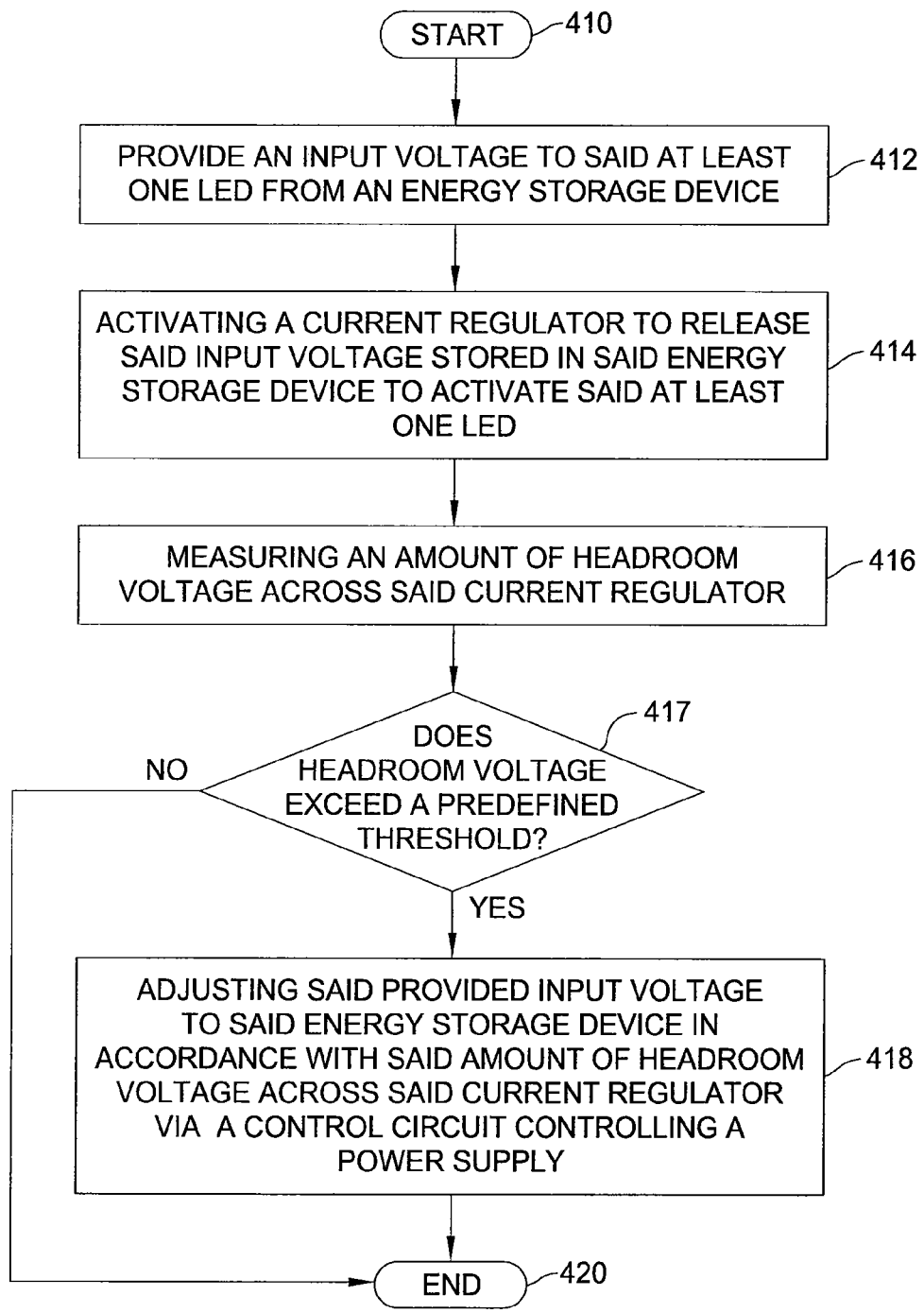
FIG. 4 illustrates a flow chart of an illustrative method for monitoring input voltage and total light emitting diode forward voltage.

FIG. 4 illustrates a flow chart of an illustrative method 400 for controlling an input voltage to one or more LEDs. Method 400 begins at step 410. At step 412 the method 400 provides an input voltage to at least one LED 104 from an energy storage device 102. As discussed above, the power supply 112 may supply energy to the energy storage device 102.

Then at step 414, the method 400 activates a current regulator 106 to release said voltage stored in said energy storage device 102 to activate at least one LED 104. As discussed above, a pulse control 108 may provide the control pulses 120 to the current regulator 106 to activate and deactivate the at least one LED 104. Once current regulator 106 is activated, the energy storage device 102 may release energy stored in the energy storage device 102 across the at least one LED 104.

The method 400 continues to step 416 by measuring an amount of headroom voltage across said current regulator 106. The measured headroom voltage may be provided to a control circuit 110. As discussed above, the measured headroom voltage may then be compared to a predefined threshold to determine if an adjustment of the input voltage supplied to the energy storage device 102 by power supply 112 is necessary at decision step 417.

If the answer to decision step 417 is yes, then the method 400 proceeds to step 418 to adjust said provided input voltage to said energy storage device 102 based upon said amount of headroom voltage across said current regulator 106 via a control circuit 110. The method ends at step 420.

Alternatively, if the answer to decision step 417 is no, then the method 400 end and go directly to step 420. In other words, if the answer to decision step 417 is no, the amount of input voltage provided to the energy storage device may be maintained.

Furthermore, one skilled in the art will recognize that the measuring step 416 and adjusting step 418 may be optionally repeated until the answer to decision step 417 results in no.

While various embodiments have been described above, it should be understood that they have been presented by way of example only, and not limitation. Thus, the breadth and scope of a preferred embodiment should not be limited by any of the above-described illustrative embodiments, but should be defined only in accordance with the following claims and their equivalents.

What is claimed is:

1. A system for controlling an input voltage to at least one light emitting diode (LED), comprising:
    an energy storage device;
    at least one LED coupled to said energy storage device;
    a current regulator coupled to said at least one LED for controlling activation and deactivation of said at least one LED; and
    a control circuit coupled to said current regulator for controlling a power supply providing said input voltage to said energy storage device, wherein said input voltage is provided in accordance with an amount of a headroom voltage measured across said current regulator, wherein said headroom voltage comprises a difference in an amount of said input voltage supplied by said energy storage device to said at least one LED and a forward voltage of said at least one LED.

2. The system of claim 1, wherein said energy storage device is a capacitor.

3. The system of claim 1, wherein said at least one LED comprises a plurality of LEDs.

4. The system of claim 1, wherein said current regulator is a linear current regulator.

5. The system of claim 1, further comprising:
    a pulse control that provides a series of control pulses to said current regulator for causing activation and deactivation of said at least one LED.

6. The system of claim 1, wherein said control circuit for controlling said power supply comprises adjusting an amount of said input voltage outputted by said power supply.

7. The system of claim 6, wherein said adjusting said amount of voltage outputted by said power supply comprises reducing an amount of said input voltage outputted by said power supply if said headroom voltage is above a pre-defined threshold.

8. A system for controlling an input voltage to at least one light emitting diode (LED), comprising:
    a means for storing energy;
    at least one LED coupled to said means for storing energy;
    a means for regulating current to said at least one LED coupled to said at least one LED for controlling activation and deactivation of said at least one LED; and
    a means for controlling input voltage to said at least one LED coupled to said means for regulating current for controlling a means for providing said input voltage to said means for storing energy, wherein said input voltage is provided in accordance with an amount of a headroom voltage measured across said means for regulating current, wherein said headroom voltage comprises a difference in an amount of said input voltage supplied by said means for storing energy to said at least one LED and a forward voltage of said at least one LED.

9. The system of claim 8, wherein said means for storing energy is a capacitor.

10. The system of claim 8, wherein said at least one LED comprises a plurality of LEDs.

11. The system of claim 8, wherein said means for regulating current is a linear current regulator.

12. The system of claim 8, further comprising:
    a means for transmitting control pulses to said means for regulating current for activating and deactivating said at least one LED.

13. The system of claim 8, wherein said means for controlling input voltage to said at least one LED comprises adjusting an amount of said input voltage outputted by said means for providing said input voltage.

14. The system of claim 13, wherein said adjusting said amount of said input voltage outputted by said means for providing said input voltage comprises reducing an amount of voltage outputted by said means for providing said input voltage if said headroom voltage is above a pre-defined threshold.

15. A method for controlling an input voltage to at least one light emitting diode (LED), comprising:
- providing said input voltage to said at least one LED from an energy storage device;
- activating a current regulator to release said input voltage stored in said energy storage device to activate said at least one LED;
- measuring an amount of a headroom voltage across said current regulator, wherein said headroom voltage comprises a difference in an amount of said input voltage supplied by said energy storage device to said at least one LED and a forward voltage of said at least one LED; and
- adjusting said provided input voltage to said energy storage device in accordance with said amount of headroom voltage across said current regulator via a control circuit controlling a power supply.

16. The method of claim 15, wherein said measuring further comprises:
- providing said headroom voltage to said control circuit;
- comparing said headroom voltage to a pre-defined threshold value via said control circuit; and
- if said headroom voltage is above said pre-defined threshold value, then applying said adjusting.

17. The method of claim 16, wherein said measuring further comprises:
- if said headroom voltage is below said pre-defined threshold value, maintaining an amount of said input voltage provided to said energy storage device.

18. The method of claim 16, further comprising:
- repeating said measuring and adjusting until said headroom voltage is below said pre-defined threshold value.

* * * * *